(12) United States Patent
Arora

(10) Patent No.: US 11,882,057 B2
(45) Date of Patent: Jan. 23, 2024

(54) PLUGGABLE CLOUD SECURITY SYSTEM

(71) Applicant: Bank of America Corporation, Charlotte, NC (US)

(72) Inventor: Saurabh Arora, Gurugram (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/656,838

(22) Filed: Mar. 28, 2022

(65) Prior Publication Data

US 2023/0318989 A1 Oct. 5, 2023

(51) Int. Cl.
*H04L 47/80* (2022.01)
*H04L 67/1012* (2022.01)
*H04L 47/78* (2022.01)
*H04L 47/762* (2022.01)

(52) U.S. Cl.
CPC .......... *H04L 47/803* (2013.01); *H04L 47/762* (2013.01); *H04L 47/781* (2013.01); *H04L 67/1012* (2013.01)

(58) Field of Classification Search
CPC ....... H04L 63/10; H04L 63/105; H04L 47/70; H04L 47/762; H04L 47/781; H04L 47/803; H04L 67/1012
See application file for complete search history.

(56) References Cited

U.S. PATENT DOCUMENTS

| | | | |
|---|---|---|---|
| 7,698,223 B2 | 4/2010 | Padawer et al. | |
| 9,088,509 B1 | 7/2015 | Sella et al. | |
| 9,258,315 B2 | 2/2016 | Martin | |
| 9,460,288 B2 | 10/2016 | Call et al. | |
| 9,471,405 B1 | 10/2016 | Mor | |
| 9,578,050 B1 | 2/2017 | Barabash et al. | |
| 9,602,341 B1 | 3/2017 | Degwekar et al. | |
| 9,661,064 B2 | 5/2017 | Kranz et al. | |
| 9,787,718 B2 | 10/2017 | Kapoor et al. | |
| 9,832,024 B2 | 11/2017 | Xu et al. | |
| 9,843,450 B2 | 12/2017 | Kravitz et al. | |
| 9,866,578 B2 | 1/2018 | Moore | |
| 9,882,715 B2 | 1/2018 | Alness et al. | |
| 9,882,767 B1 | 1/2018 | Foxhoven et al. | |
| 10,320,844 B2 | 6/2019 | Vincent et al. | |
| 10,432,598 B2 | 10/2019 | Chermside | |
| 10,491,638 B2 | 11/2019 | Narayanaswamy et al. | |

(Continued)

FOREIGN PATENT DOCUMENTS

WO  2017083140 A1  5/2017

*Primary Examiner* — Jeong S Park

(57) ABSTRACT

A pluggable cloud security system includes a plurality of nodes. Each node has a memory and a processor. At least one memory is configured to store rules indicating criteria for allowing communication between user applications and a hosted application executed by a cloud infrastructure. At least one processor is configured to receive data to be communicated to the cloud application, determine a source of the received data as a first user application, determine a channel used to transmit the received data, and determine, using the rules, whether the source and the channel satisfy criteria for allowing communication between the first user application and the hosted application. If it is determined that the source satisfies the first criteria, transmission of the data is allowed. Otherwise, transmission of the data is prevented.

17 Claims, 3 Drawing Sheets

(56) References Cited

U.S. PATENT DOCUMENTS

| | | |
|---|---|---|
| 10,581,800 B2 | 3/2020 | Morrison |
| 10,587,580 B2 | 3/2020 | Subbarayan et al. |
| 10,594,656 B2 | 3/2020 | Devarajan et al. |
| 10,666,621 B2 | 5/2020 | Subbarayan et al. |
| 10,681,012 B2 | 6/2020 | Subbarayan et al. |
| 10,728,287 B2 | 7/2020 | Foxhoven et al. |
| 10,754,628 B2 | 8/2020 | Hernan et al. |
| 10,795,992 B2 | 10/2020 | Dykes |
| 11,050,765 B2 | 6/2021 | Lin et al. |
| 11,089,064 B1 | 8/2021 | Sarukkai et al. |
| 11,182,474 B2 | 11/2021 | Simpson et al. |
| 11,228,573 B1* | 1/2022 | Rangasamy ...... H04L 12/40006 |
| 11,265,342 B2 | 3/2022 | Nikam et al. |
| 2011/0119312 A1 | 5/2011 | Chopra et al. |
| 2016/0028737 A1* | 1/2016 | Srinivasan .......... H04L 63/0807 726/4 |
| 2016/0292398 A1 | 10/2016 | Makam et al. |
| 2017/0093878 A1* | 3/2017 | Rodniansky ............ G06F 21/85 |
| 2017/0300986 A1 | 10/2017 | Kassaei et al. |
| 2018/0074860 A1* | 3/2018 | Altuzar ................... G06F 9/505 |
| 2018/0115551 A1* | 4/2018 | Cole .................... H04L 47/783 |
| 2019/0026135 A1* | 1/2019 | Chen ...................... H04L 41/40 |
| 2019/0199751 A1* | 6/2019 | Lipman ................... H04L 63/10 |
| 2020/0192708 A1* | 6/2020 | Wu ....................... G06F 16/285 |
| 2020/0195615 A1 | 6/2020 | Pikle et al. |
| 2020/0195649 A1* | 6/2020 | He .......................... H04L 63/10 |
| 2020/0199751 A1* | 6/2020 | Singhal ............... H01L 21/0228 |
| 2020/0220875 A1 | 7/2020 | Harguindeguy et al. |
| 2021/0067337 A1 | 3/2021 | Bahrami et al. |
| 2021/0112088 A1 | 4/2021 | Ramasamy et al. |
| 2021/0144550 A1 | 5/2021 | Ito et al. |
| 2021/0328969 A1 | 10/2021 | Gaddam et al. |
| 2021/0336803 A1 | 10/2021 | Sugihara et al. |
| 2021/0385252 A1 | 12/2021 | Lebin et al. |
| 2021/0406383 A1 | 12/2021 | Ahuja |
| 2022/0006829 A1 | 1/2022 | Nikam et al. |
| 2022/0070279 A1 | 3/2022 | Pang et al. |
| 2023/0016036 A1* | 1/2023 | Friel .................... H04L 9/0894 |

\* cited by examiner

PLUGGABLE CLOUD SECURITY SYSTEM

TECHNICAL FIELD

The present disclosure relates generally to distributed networks, and more specifically to a pluggable cloud security system.

BACKGROUND

Computing applications may be hosted in a cloud to provide access to a range of functionality and information. User devices can access the functionality and/or information provided by the cloud-hosted application. Application programming interfaces (APIs) provide a software interface between user applications executed on the user devices and the cloud-hosted applications. There exists a need for improved technology for operating the infrastructure to provide cloud-hosted application.

SUMMARY

Certain embodiments of this disclosure are integrated into the practical application of a pluggable cloud security system that provides unique solutions to technical problems of previous technology, for example, by controlling which components of cloud-hosted applications are exposed to different user applications. For example, the disclosed system provides several technical advantages which may include 1) improved use of processing, memory, and networking resources because invalid and/or incomplete communications may be prevented from reaching resource-limited cloud infrastructure; 2) improved reliability of access to cloud-hosted applications through the automatic scaling of resources allocated to the pluggable cloud security system; 3) improved data security provided by the pluggable cloud security system acting as a proxy for any attempted attacks without requiring changes to the underlying code of cloud-hosted applications; and 4) improved identification of potential capacity overload at the cloud infrastructure hosting applications. As such, this disclosure may improve the function of computer systems used to host applications. For example, the system described in this disclosure may decrease processor and memory consumption by the infrastructure used to host applications, while providing improved security to the hosted applications and any associated information or data. As another example, the pluggable cloud security system may facilitate the more reliable, efficient, and secure use of legacy cloud-hosted applications without making any changes to the code of these applications.

Certain embodiments of this disclosure may include some, all, or none of these advantages. These advantages and other features will be more clearly understood from the following detailed description taken in conjunction with the accompanying drawings and claims.

In an embodiment, a system includes a plurality of nodes. Each node has a memory and a processor. At least one memory is configured to store rules indicating criteria for allowing communication between user applications and a hosted application executed by a cloud infrastructure. At least one processor is configured to receive data to be communicated to the cloud application, determine a source of the received data as a first user application, determine a channel used to transmit the received data, and determine, using the rules, whether the source and the channel satisfy first criteria included in the rules for allowing communication between the first user application and the hosted application. If it is determined that the source satisfies the first criteria for allowing communication between the first user application and the hosted application, transmission of the data is allowed to the cloud infrastructure hosting the hosted application. If it is determined that the source does not satisfy the first criteria for allowing communication between the first user application and the hosted application, transmission of the data is prevented to the cloud infrastructure hosting the hosted application, such that processing and memory resources of the cloud infrastructure are conserved.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
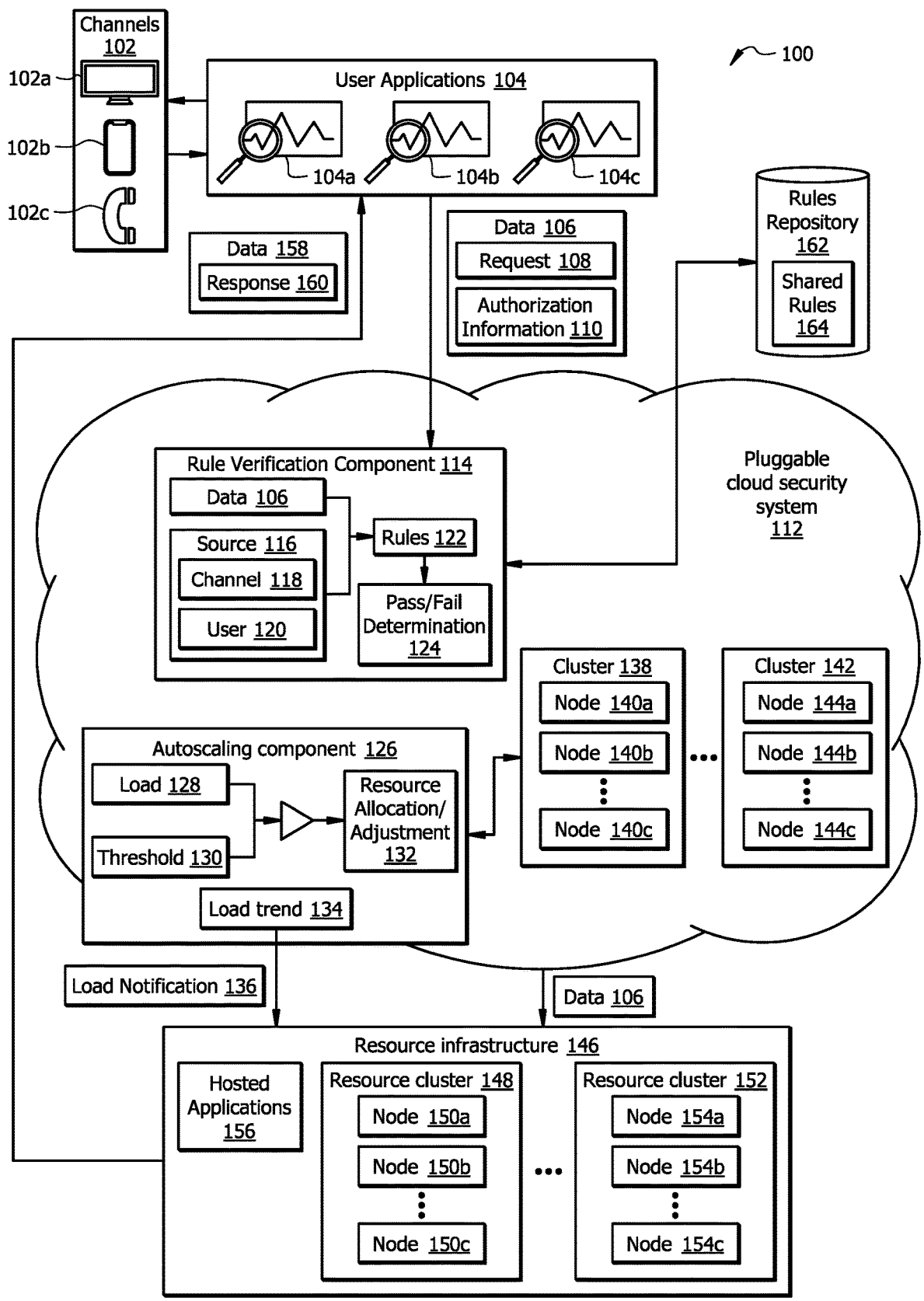
FIG. 1 is a diagram illustrating an embodiment of an environment with a pluggable cloud security system.
Figure 2:
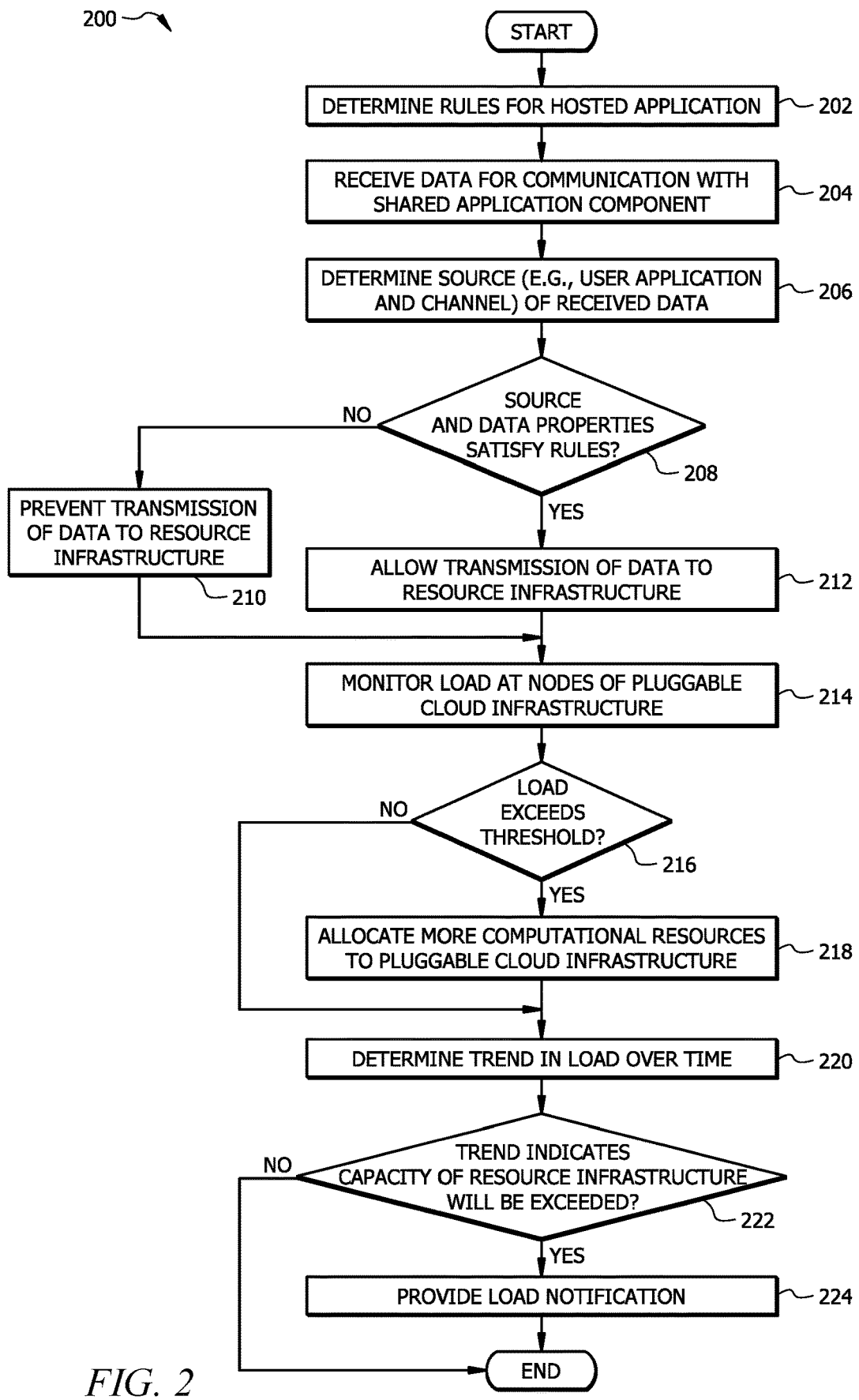
FIG. 2 is a flowchart illustrating an example method of operating the pluggable cloud security system of FIG. 1.
Figure 3A:
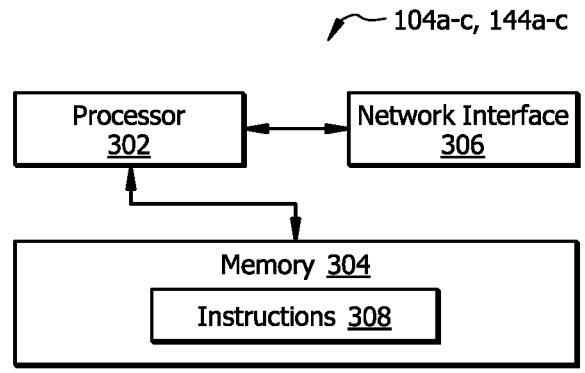
FIG. 3A is a diagram illustrating hardware components of an example node of the pluggable cloud security system of the environment of FIG. 1.
Figure 3B:
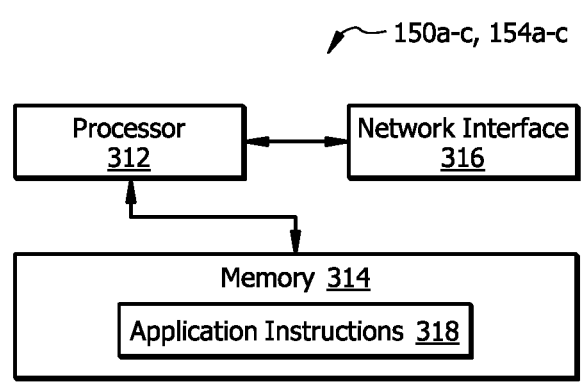
FIG. 3B is a diagram illustrating hardware components of an example node of the resource infrastructure of the environment of FIG. 1.

This disclosure recognizes problems of previous cloud computing technology. For example, in many computing infrastructures, at least some portion of cloud-hosted applications are relatively old legacy software that cannot be rewritten or reconfigured to take advantage of modern technology (e.g., because of established rules or regulations related to the use of this software). Previously, tools were lacking for scaling the use of such legacy hosted applications in a reliable and secure manner. The pluggable cloud security system of this disclosure solves these and other problems of previous technology, as described below with respect to FIGS. 1-3. FIG. 1 shows an example environment in which a pluggable cloud security system improves reliability, efficiency, and security of a cloud infrastructure. FIG. 2 shows an example method of operating the pluggable cloud security system of FIG. 1. FIGS. 3A and 3B provide further description of example hardware components of the pluggable cloud security system and the cloud infrastructure.

Cloud Environment with Pluggable Cloud Security System

FIG. 1 shows an example cloud environment 100 that includes a pluggable cloud security system 112 that improves the efficiency and security of a resource infrastructure 146 that is used to provide access to hosted applications 156. The pluggable cloud security system 112 facilitates access to the hosted applications 156 by a number of user applications 104. Data 106 communicated by the user applications 104 is first received by the pluggable cloud security system 112, which checks that the data 106 is appropriate for routing to the resource infrastructure 146. The data 106 may only be transmitted to the resource infrastructure 146 if predefined rules 122 are satisfied associated with the type of information included in data 106 and/or the source 116 of the data 106. For example, if data 106 is missing an appropriate request 108 and/or authorization information 110 needed by the resource infrastructure, the rules 122 may not me satisfied and a pass/fail determination 124 may indicate to prevent transmission of data 106. As another example, if the data 106 is received from a source 116 (e.g., a channel 118 and user 120 combination) that does not satisfy the predefined rules 122, transmission of the data 106 may be prevented. In this way the pluggable cloud security system 112 reduces the load at the resource infrastructure 146 by reducing or eliminating the waste of computing resources attempting to handle incomplete or improper data 106 that does not satisfy the rules 122. The pluggable cloud security system 112 also reduces or prevents the transfer of data 106 that includes a malicious intent (e.g., denial-of-Service and/or SQL attacks) from reaching the resource infrastructure, thereby increasing the security of the resource infrastructure 146 and associated information. For example, if the data 106 includes information associated with a data-compromising attack, a pass/fail determination 124 may indicate to prevent transmission of the data 106 to the resource infrastructure 146 and consequently prevent the attack from reaching its target.

The user applications 104 may be software programs executing on computing devices (e.g., channels 102). The user applications 104 may interact with the hosted applications 156 executed on the resource infrastructure 146, as described further below. For example, a user application 104 may display a user interface for providing and/or requesting information to/from the hosted applications 156. For the purposes of example, three user applications 104a-c are illustrated in the example of FIG. 1. However, the cloud environment 100 could include any number of user applications 104. For example, a first user application 104a may be used to access a given hosted application 156, a second user application 104b may be used to interface with another hosted application 156. A third user application 104c may be used to access the same hosted application 156 as the first or second user applications 104a,b but may be configured to access a different subset of the components, or functions, of that hosted application 156. Data 106 is sent by the user applications 104 in order to be communicated with the hosted applications 156. Each user application 104 may be associated with a channel 102 or device type that is used to implement the user application 104 and provide the data 106. Example channels 102 include a first channel 102a corresponding to desktop device channel, a second channel 102b corresponding to a mobile device channel, and a third channel 102c corresponding to a telephone device channel. The user applications 104 may include the applications themselves, associated APIs, or a combination of both.

The pluggable cloud security system 112 includes one or more clusters 138, 142 of computing nodes 140a-c, 144a-c. Each computing node 140a-c, 144a-c includes hardware components as illustrated in the example of FIG. 3A and described in greater detail below. At least one processor (e.g., processor 302 of FIG. 3A) is configured to execute the operations described in this disclosure, for example, with respect to the rule verification component 114 and autoscaling component 126. In the example of FIG. 1, the pluggable cloud security system 112 is shown with two clusters 138, 142. However, the pluggable cloud security system 112 may have any number of clusters 138, 142. In some embodiments, the number of clusters 138, 142 (e.g., an/or the number of nodes 140a-c, 144a-c in the clusters 138, 142) is scaled up or down based on a monitored load 128 of the pluggable cloud security system 112, as described in greater detail below with respect to the autoscaling component 126.

The pluggable cloud security system 112 receives data 106 from a user application 104. Received data 106 may include a request 108 for information and/or to implement some action in a hosted application 156. Data 106 may also include authorization information 110. The authorization information 110 may include information, such as a password, registration key, or the like, that can be used to verify that the user application 104 is authorized to access or use a given hosted application 156. Data 106 is provided to the rule verification component 114.

The rule verification component 114 uses rules 122 to determine a pass/fail determination 124 indicating whether the data 106 should be transmitted to the resource infrastructure 146 or whether this transmission should be prevented. The rules 122 may be multilayered, such that a first layer of rules 122 verifies that the source 116 is validated to send data 106 to the resource infrastructure 146 and another layer verifies that the data 106 itself (e.g., the request 108 and/or any required authorization information 110) is appropriately structured to be provided to the resource infrastructure 146. If one of the rules 122 for one of these layers is not met, transmission of the data 106 to the resource infrastructure 146 is prevented. The pass/fail determination 124 improves the use of computing resources at the resource infrastructure 146, for example, by making utilization of the resource clusters 148, 152 more efficient and secure as described in greater detail with respect to various examples of this disclosure. The rules 122 may indicate types of information that should be included in the data 106 in order for the data to be transmitted to the resource infrastructure 146. For example, a rule 122 for transmitting data 106 that is associated with a given hosted application 156 may require that the request 108 included in the data 106 is compatible with the hosted application 156 (e.g., that the request has an appropriate content and format for use by the hosted application 156). For instance, a rule 122 may indicate that a request 108 must include certain request parameters to receive a passing pass-fail determination 124. In some cases, a rule 122 may indicate that a request 108 must include certain required terms or other information to receive a passing pass-fail determination 124. In some cases, a rule 122 may indicate that a request 108 must include a certain header or certain information in a header in order to receive a passing pass-fail determination 124, having certain header in the request 108. As another example, a rule 122 for transmitting data 106 that is associated with a given hosted application 156 may require that the authorization information 110 included in the data 106 is appropriate for the hosted application 156 (e.g., that the authorization information 110 has an appropriate content and/or format for being authenticated by the hosted application 156). In this way, the pluggable cloud security system 112 helps prevent data 106 that cannot be properly processed by the hosted application 156 from ever reaching the resource infrastructure 146. This prevents the waste of computing resources in handling such data 106.

In some cases, the rules 122 may be specific to channels 102 and/or user applications 104. For example, a first channel 102a (e.g., a desktop device channel) may have access to a first subset (up to all) components or functions of a hosted application 156, while a second channel 102b (e.g., a mobile device channel) and a third channel 102c (e.g., a telephone device channel) may have access to different subsets of components or functions of the hosted application 156. Similarly, different user applications 104a-c may have access to different hosted applications 156 and/or functions of the hosted applications 156. For instance, a first user application 104a may be able to access information from a hosted application 156, while another user application 104b may be able to both access and modify information of the hosted application 156.

In some embodiments, rules 122 may be specific to combinations of channels 102 and user applications 104. For example, the first user application 104a may have different rules 122 depending on the channel 102 used to execute the first user application 104a. To assess whether such rules 122 are satisfied, the pluggable cloud security system 112 may determine a source 116 of the received data 106. The source 116 may correspond to the channel 118 and/or user 120 from which the data 106 was received. The channel 118 indicates the channel 102 through which the data 106 was provided. The user 120 corresponds to the user application 104 from which the data 106 was provided. The pluggable cloud security system 112 determines, using the rules 122, whether the source 116 (e.g., the channel 118 and/or user 120) satisfy criteria for allowing communication of the data 106 (e.g., between the user 120 and/or channel 118 and the hosted application 156).

If it is determined that the source 116 satisfies the criteria indicated by the rules 122, the pluggable cloud security system 112 allows transmission of the data 106 to the resource infrastructure 146 hosting the hosted application 156. However, if it is determined that the source 116 does not satisfy the criteria indicated by the rules 122, the pluggable cloud security system 112 prevents transmission of the data 106 to the resource infrastructure 146 hosting the hosted application 156, such that computing (e.g., processing and memory) resources of the resource infrastructure 146 are conserved.

The pluggable cloud security system 112 may enforce rules 122 for which the different user applications 104 or associated APIs are subscribed (e.g., as configured by a user or administrator of the cloud environment 100). In some embodiments, the rules 122 are determined by accessing a rules repository 162 that stores predefined rules 164 shared by the user applications 104. For example, the shared rules 164 may be those established by an administrator of the cloud environment 100. When the shared rules 164 are changed or updated, these changes may be automatically propagated to the rules 122 used by the pluggable cloud security system 112. For example, the pluggable cloud security system 112 may automatically determine the rules 122 based at least in part on the predefined rules 164 of the rule repository 162 and store these rules in a memory (e.g., memory 304 of FIG. 3A) of the pluggable cloud security system 112.

The autoscaling component 126 further improves operation of the pluggable cloud security system 112 and the resource infrastructure 146 used for hosting the hosted applications 156. For example, the autoscaling component 126 may dynamically scale the number of nodes 140a-c, 144a-c available to a given cluster 138, 142 and/or the number of clusters 138, 142 based on a number of registered user applications 104 and/or the amount of data 106 being communicated via the pluggable cloud security system 112. The amount of data 106 being processed by the pluggable cloud security system 112 is determined as load 128. For example, the load 128 may be the number of API calls being sent to transmit the data 106. The load 128 may be an amount of computing resources consumed by the nodes 140a-c, 144a-c. If the load 128 exceeds a predefined threshold 130 (e.g., a threshold resource consumption, a threshold call count, or the like), a resource allocation/adjustment 132 may be made to the clusters 138, 142. For example, additional computing resources may be allocated to the clusters 138, 142 and/or nodes 140a-c, 144a-c.

The autoscaling component 126 may further facilitate the intelligent allocation of resources to the resource infrastructure 146 in order to further protect against overloading the resource infrastructure 146. For example, the autoscaling component 126 may determine a load trend 134 corresponding to changes in the usage of computing resources by the resource infrastructure 146 over time. For example, the load trend 134 may indicate an amount of memory (e.g., memory 314 of FIG. 3B) consumed by the nodes 150a-c, 154a-c of the resource infrastructure 146 over a predefined period of time (e.g., hours, days, weeks, months, etc.). If the load trend 134 indicates an anticipated overload of the resource infrastructure 146 in the future (e.g., in the next hours, days, weeks, etc.), a load notification 136 may be provided to request allocation of additional computing resources (e.g., additional nodes 150a-c, 154a-c or clusters 148, 152) to the resource infrastructure 146. In some cases, resources may be allocated to the resource infrastructure 146 automatically.

In some embodiments, the pluggable cloud security system 112 can dynamically add and/or modify the rules 122 to adjust the hosted applications 156 available to the user applications 104 for security and/or latency needs. For example, if the load 128 at the pluggable cloud security system 112 exceeds a threshold 130 for a given user application 104, this may be indicative of some inappropriate use or malfunction of the user application 104. The rules 122 may be changed at least temporarily to block data from such a user application 104. Similarly, if an excessive amount of memory or other computing resource is consumed by a given user application 104, the rules 122 may be adjusted to at least temporarily block or limit data transmission from that user application 104.

The resource infrastructure 146 includes one or more resource clusters 148, 152 used to implement hosted applications 156. The resource infrastructure 146 may be referred to as a cloud infrastructure. Each of the resource clusters 148, 152 includes computing nodes 150a-c, 154a-c, as illustrated in the example of FIG. 1. The hosted application 156 generates data 158 that is provided back to the user application 104a-c that sent data 106 (e.g., as an API call). The data 158 may include a response 160 to the request 108 provided in data 106. The nodes include hardware components configured to execute operations of the hosted applications 156. Further details of the hardware components of the resource infrastructure 146 are provided below with respect to the processor, memory, and network interface of FIG. 3B.

The pluggable cloud security system 112 may help prevent nodes 150a-c, 154a-c from going out of memory or wasting processing resources by reducing the amount of invalid and/or security-compromising data 106 reaching the nodes 150a-c, 154a-c, thereby improving the overall efficiency of the resource infrastructure 146 without requiring any changes to the code of the hosted applications 156, which may not be feasible. For example, as described above, the pluggable cloud security system 112 may dynamically reject data 106 (e.g., sent as an API call from a user application 104) from reaching nodes 150a-c, 154a-c if the data 106 is not from an authorized user application 104 and allowed channel 102 (e.g., using rules 122, as described above). This may prevent hosted applications 156, including relatively inefficient legacy hosted applications 156, executed by the resource infrastructure 146 from performing unnecessary processing tasks and wasting memory or other resources.

Example Operation of a Pluggable Cloud Security System

FIG. 2 illustrates an example method 200 of operating the pluggable cloud security system 112 of FIG. 1. The method 200 may be implemented using the processor 302, memory 304, and network interface 306 of FIG. 3A, described below. The method 200 may begin at operation 202 where the pluggable cloud security system 112 determines rules 122 for communicating with or accessing hosted applications 156. As described above, the rules 122 may be determined based on components of the hosted applications 156 that can (e.g., based on capabilities of the channels 102 and/or user applications 104) and should (e.g., based on authorization privileges of the channels 102 and/or user applications 104) be accessible to the channels 102 and/or user applications 104. The rules 122 may further indicate types of requests 108 and/or authorization information 110 that is needed for data to be successfully processed by the hosted applications 156. In some embodiments, at least a portion of the rules 122 are determined based on shared rules 164 accessed from a centralized repository 162.

At operation 204, the pluggable cloud security system 112 receives data 106 to be communicated to a hosted application 156. The data 106 may be included in an API call from a user application 104 to the hosted application 156. At operation 206, the pluggable cloud security system 112 determines the source 116 of the data 106, as described for example, with respect to the operations of the rule verification component 114 above. At operation 208, the pluggable cloud security system 112 determines whether the source 116 and other properties of the data 106 satisfy the rules from operation 202 (see, e.g., description of the implementation of rules 122 with respect to FIG. 1 above). If the rules 122 are not satisfied, the pluggable cloud security system 112 proceeds to operation 210 and prevents transmission of the data 106 to the resource infrastructure 146 that implements the hosted application 156. Otherwise, if the rules 122 are satisfied, the pluggable cloud security system 112 proceeds to operation 212 and allows transmission of the data 106 to the resource infrastructure 146 that implements the hosted application 156.

At operation 214, the pluggable cloud security system 112 monitors the load 128 at the pluggable cloud security system 112. For example, the pluggable cloud security system 112 may determine an amount of memory used by the nodes 140a-c, 144a-c and/or a number of API calls received per period of time. At operation 216, the pluggable cloud security system 112 determines whether the load 128 exceeds a predefined threshold 130. If the threshold 130 is exceeded, the pluggable cloud security system 112 proceeds to operation 218 and allocates additional resources (e.g., nodes 140a-c, 144a-c and/or clusters 138, 142) to the pluggable cloud security system 112, such that the pluggable cloud security system 112 is not overloaded.

At operation 220, the pluggable cloud security system 112 determines a load trend 134 of the resource infrastructure 146 used to execute the hosted application 156 (see description of a load trend 134 above with respect to FIG. 1). At operation 222, the pluggable cloud security system 112 determines if the load trend 134 indicates that the capacity of the resource infrastructure 146 may be reached or exceeded in the future. If this is the case, the pluggable cloud security system 112 proceeds to operation 224 and provides a load notification 136 requesting allocation of additional computing resources to the resource infrastructure 146.

Example Hardware Components

FIG. 3A shows an example node 140a-c, 144a-c of the pluggable cloud security system 112 of FIG. 1. The node 140a-c, 144a-c includes a processor 302, memory 304, and network interface 306. The processor 302 includes one or more processors. The processor 302 is any electronic circuitry including, but not limited to, state machines, one or more central processing unit (CPU) chips, logic units, cores (e.g. a multi-core processor), field-programmable gate array (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304 and network interface 306. The one or more processors are configured to process data and may be implemented in hardware and/or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory 304 and executes them by directing the coordinated operations of the ALU, registers and other components.

The memory 304 is operable to store any data, instructions, logic, rules, or code operable to execute the functions of the pluggable cloud security system 112. The memory 304 may store instructions 308 for implementing any of the operations described above with respect to FIGS. 1 and 2 (e.g., for implementing the rule verification component 114 and the autoscaling component 126 of FIG. 1 and performing the method 200 of FIG. 2). The memory 304 includes one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The network interface 306 is configured to enable wired and/or wireless communications. The network interface 306 is configured to communicate data between the pluggable cloud security system 112 and other network devices, systems, or domain(s), such as the user applications 104 via channels 102 and the resource infrastructure 146. The network interface 306 is an electronic circuit that is configured to enable communications between devices. For example, the network interface 306 may include one or more serial ports (e.g., USB ports or the like) and/or parallel ports (e.g., any type of multi-pin port) for facilitating this communication. As a further example, the network interface 306 may include a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol.

FIG. 3B shows an example node 150a-c, 154a-c of the resource infrastructure 146 of FIG. 1. The node 150a-c, 154a-c includes a processor 312, memory 314, and network interface 316. The processor 312 includes one or more processors. The processor 312 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 312 may be a programmable logic device, a microcontroller, a microprocessor, or any suitable combination of the preceding. The processor 312 is communicatively coupled to and in signal communication with the memory 314 and network interface 316. The one or more processors are configured to process data and may be implemented in hardware and/or software. For example, the processor 312 may be 8-bit, 16-bit, 32-bit, 64-bit or of any other suitable architecture. The processor 312 may include an arithmetic logic unit (ALU) for performing arithmetic and logic operations, processor registers that supply operands to the ALU and store the results of ALU operations, and a control unit that fetches instructions from memory 314 and executes them by directing the coordinated operations of the ALU, registers and other components.

The memory 314 is operable to store any data, instructions, logic, rules, or code operable to execute the functions of the resource infrastructure 146. The memory 314 may store application instructions 318, which include instructions for implementing operations of the hosted applications 156, such as generating data 158 with a response 160 to the data 106 and/or request 108 received by the resource infrastructure 146. The memory 314 includes one or more disks, tape drives, or solid-state drives, and may be used as an over-flow data storage device, to store programs when such programs are selected for execution, and to store instructions and data that are read during program execution. The memory 314 may be volatile or non-volatile and may comprise read-only memory (ROM), random-access memory (RAM), ternary content-addressable memory (TCAM), dynamic random-access memory (DRAM), and static random-access memory (SRAM).

The network interface 316 is configured to enable wired and/or wireless communications. The network interface 316 is configured to communicate data between the resource infrastructure 146 and other network devices, systems, or domain(s), such as the pluggable cloud security system 112. The network interface 316 is an electronic circuit that is configured to enable communications between devices. For example, the network interface 316 may include one or more serial ports (e.g., USB ports or the like) and/or parallel ports (e.g., any type of multi-pin port) for facilitating this communication. As a further example, the network interface 316 may include a WIFI interface, a local area network (LAN) interface, a wide area network (WAN) interface, a modem, a switch, or a router. The processor 312 is configured to send and receive data using the network interface 316. The network interface 316 may be configured to use any suitable type of communication protocol.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A pluggable cloud security system comprising a plurality of nodes, each node comprising a memory and a processor, wherein:
   at least one memory is configured to store rules indicating criteria for allowing communication between user applications and a hosted application executed by a cloud infrastructure; and
   at least one processor is configured to:
      determine a load at the plurality of nodes, wherein the load comprises an amount of computing resources consumed by the plurality of nodes;
      determine that the load exceeds a threshold value;
      after determining that the load exceeds the threshold value, allocate additional computing resources to the plurality of nodes, wherein allocating additional computing resources to the plurality of nodes comprises adding additional nodes to the plurality of nodes;
      receive data to be communicated to the hosted application;
      determine a source of the received data, wherein the source is a first user application;
      determine a channel used to transmit the received data;
      determine, using the rules, whether a type of information included in the received data, a format of the received data, the source and the channel satisfy first criteria included in the rules for allowing communication between the first user application and the hosted application;
      if it is determined that the type of information included in the received data, the format of the received data, the source and the channel satisfy the first criteria for allowing communication between the first user application and the hosted application, allow transmission of the data to the cloud infrastructure hosting the hosted application; and
      if it is determined that the type of information included in the received data, the format of the received data, the source and the channel do not satisfy the first criteria for allowing communication between the first user application and the hosted application, prevent transmission of the data to the cloud infrastructure hosting the hosted application, such that processing and memory resources of the cloud infrastructure are conserved.

2. The pluggable cloud security system of claim 1, wherein:
   the received data comprises a request; and
   the at least one processor is further configured to:
      determine that the request corresponds to a request type that cannot be handled by the hosted application; and
      after determining that the request corresponds to the request type that cannot be handled by the hosted application, prevent transmission of the data to the cloud infrastructure hosting the hosted application, such that the processing and memory resources of the cloud infrastructure are further conserved.

3. The pluggable cloud security system of claim 1, wherein:
the received data comprises authorization information; and
the at least one processor is further configured to:
determine that the authorization information cannot be validated by the cloud infrastructure; and
after determining that the authorization information cannot be validated by the cloud infrastructure, prevent transmission of the data to the cloud infrastructure hosting the hosted application, such that the processing and memory resources of the cloud infrastructure are further conserved.

4. The pluggable cloud security system of claim 1, wherein the at least one processor is further configured to:
determine a load trend corresponding to changes in the usage of computing resources by the cloud infrastructure over time;
determine that the load trend indicates a resource capacity of the cloud infrastructure may be exceeded at a future time; and
after determining that the load trend indicates the resource capacity of the cloud infrastructure may be exceeded at the future time, provide a notification requesting allocation of additional computing resources to the cloud infrastructure.

5. The pluggable cloud security system of claim 1, wherein the at least one processor is further configured to:
access a rules repository comprising predefined rules shared by the user applications;
automatically determine the rules based at least in part on the predefined rules of the rule repository; and
cause the determined rules to be stored in the at least one memory.

6. The pluggable cloud security system of claim 1, wherein the channel is a mobile device channel or a desktop device channel.

7. A method, comprising:
determining a load at a plurality of nodes, wherein the load comprises an amount of computing resources consumed by the plurality of nodes;
determining that the load exceeds a threshold value;
after determining that the load exceeds the threshold value, allocating additional computing resources to the plurality of nodes, wherein allocating additional computing resources to the plurality of nodes comprises adding additional nodes to the plurality of nodes;
storing rules indicating criteria for allowing communication between user applications and a hosted application executed by a cloud infrastructure;
receiving data to be communicated to the hosted application;
determining a source of the received data, wherein the source is a first user application;
determining a channel used to transmit the received data;
determining, using the rules, whether a type of information included in the received data, a format of the received data, the source and the channel satisfy first criteria included in the rules for allowing communication between the first user application and the hosted application;
if it is determined that the type of information included in the received data, the format of the received data, the source and the channel satisfy the first criteria for allowing communication between the first user application and the hosted application, allowing transmission of the data to the cloud infrastructure hosting the hosted application; and
if it is determined that the type of information included in the received data, the format of the received data, the source and the channel do not satisfy the first criteria for allowing communication between the first user application and the hosted application, preventing transmission of the data to the cloud infrastructure hosting the hosted application, such that processing and memory resources of the cloud infrastructure are conserved.

8. The method of claim 7, wherein:
the received data comprises a request; and
the method further comprises:
determining that the request corresponds to a request type that cannot be handled by the hosted application; and
after determining that the request corresponds to the request type that cannot be handled by the hosted application, preventing transmission of the data to the cloud infrastructure hosting the hosted application, such that the processing and memory resources of the cloud infrastructure are further conserved.

9. The method of claim 7, wherein:
the received data comprises authorization information; and
the method further comprises:
determining that the authorization information cannot be validated by the cloud infrastructure; and
after determining that the authorization information cannot be validated by the cloud infrastructure, preventing transmission of the data to the cloud infrastructure hosting the hosted application, such that the processing and memory resources of the cloud infrastructure are further conserved.

10. The method of claim 7, further comprising:
determining a load trend corresponding to changes in the usage of computing resources by the cloud infrastructure over time;
determining that the load trend indicates a resource capacity of the cloud infrastructure may be exceeded at a future time; and
after determining that the load trend indicates the resource capacity of the cloud infrastructure may be exceeded at the future time, providing a notification requesting allocation of additional computing resources to the cloud infrastructure.

11. The method of claim 7, further comprising:
accessing a rules repository comprising predefined rules shared by the user applications;
automatically determining the rules based at least in part on the predefined rules of the rule repository; and
storing the determined rules to be stored in memory.

12. The method of claim 7, wherein the channel is a mobile device channel or a desktop device channel.

13. A non-transitory computer-readable medium storing instructions that, when executed by a processor, cause the processor to:
determine a load at a plurality of nodes, wherein the load comprises an amount of computing resources consumed by the plurality of nodes;
determine that the load exceeds a threshold value;
after determining that the load exceeds the threshold value, allocate additional computing resources to the plurality of nodes, wherein allocating additional computing resources to the plurality of nodes comprises adding additional nodes to the plurality of nodes;
store rules indicating criteria for allowing communication between user applications and a hosted application executed by a cloud infrastructure;
receive data to be communicated to the hosted application;
determine a source of the received data, wherein the source is a first user application;
determine a channel used to transmit the received data;
determine, using the rules, whether a type of information included in the received data, a format of the received data, the source and the channel satisfy first criteria included in the rules for allowing communication between the first user application and the hosted application;
if it is determined that the type of information included in the received data, the format of the received data, the source and channel satisfy the first criteria for allowing communication between the first user application and the hosted application, allow transmission of the data to the cloud infrastructure hosting the hosted application; and
if it is determined that the type of information included in the received data, the format of the received data, the source and the channel do not satisfy the first criteria for allowing communication between the first user application and the hosted application, prevent transmission of the data to the cloud infrastructure hosting the hosted application, such that processing and memory resources of the cloud infrastructure are conserved.

14. The non-transitory computer-readable medium of claim 13, wherein:
the received data comprises a request; and
the instructions when executed by the processor further cause the processor to:
determine that the request corresponds to a request type that cannot be handled by the hosted application; and
after determining that the request corresponds to the request type that cannot be handled by the hosted application, prevent transmission of the data to the cloud infrastructure hosting the hosted application, such that the processing and memory resources of the cloud infrastructure are further conserved.

15. The non-transitory computer-readable medium of claim 13, wherein:
the received data comprises authorization information; and
the instructions when executed by the processor further cause the processor to:
determine that the authorization information cannot be validated by the cloud infrastructure; and
after determining that the authorization information cannot be validated by the cloud infrastructure, prevent transmission of the data to the cloud infrastructure hosting the hosted application, such that the processing and memory resources of the cloud infrastructure are further conserved.

16. The non-transitory computer-readable medium of claim 13, wherein the instructions when executed by the processor further cause the processor to:
determine a load trend corresponding to changes in the usage of computing resources by the cloud infrastructure over time;
determine that the load trend indicates a resource capacity of the cloud infrastructure may be exceeded at a future time; and
after determining that the load trend indicates the resource capacity of the cloud infrastructure may be exceeded at the future time, provide a notification requesting allocation of additional computing resources to the cloud infrastructure.

17. The non-transitory computer-readable medium of claim 13, wherein the instructions when executed by the processor further cause the processor to:
access a rules repository comprising predefined rules shared by the user applications;
automatically determine the rules based at least in part on the predefined rules of the rule repository; and
cause the determined rules to be stored in memory.

* * * * *